United States Patent
Taniuchi et al.

(10) Patent No.: US 11,721,803 B2
(45) Date of Patent: Aug. 8, 2023

(54) SOLID-STATE BATTERY

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 380 days.

(21) Appl. No.: 16/980,840

(22) PCT Filed: Dec. 7, 2018

(86) PCT No.: PCT/JP2018/045122
§ 371 (c)(1),
(2) Date: Sep. 14, 2020

(87) PCT Pub. No.: WO2019/181097
PCT Pub. Date: Sep. 26, 2019

(65) Prior Publication Data
US 2021/0028449 A1    Jan. 28, 2021

(30) Foreign Application Priority Data
Mar. 19, 2018   (JP) .................................. 2018-051216

(51) Int. Cl.
*H01M 4/36*      (2006.01)
*H01M 4/66*      (2006.01)
(Continued)

(52) U.S. Cl.
CPC .......... *H01M 4/366* (2013.01); *H01M 4/661* (2013.01); *H01M 4/663* (2013.01);
(Continued)

(58) Field of Classification Search
CPC ..... H01M 4/64–669; H01M 4/36–366; H01M 10/562; H01M 10/0564–0565
See application file for complete search history.

(56) References Cited

U.S. PATENT DOCUMENTS

2012/0202101 A1* 8/2012 Ueda .................... H01M 50/119
429/127
2016/0200850 A1* 7/2016 Hatanaka .............. C08F 226/06
526/260
(Continued)

FOREIGN PATENT DOCUMENTS

JP  2014026747 A  2/2014
JP  2015088333 A  5/2015
(Continued)

*Primary Examiner* — Brian R Ohara
(74) *Attorney, Agent, or Firm* — CKC & Partners Co., LLC

(57) ABSTRACT

The present invention is a solid-state battery formed of a plurality of repeatedly stacked solid-state battery cells each including a positive electrode layer, a negative electrode layer, a solid-state electrolyte layer, and a pair of current collector layers sandwiching said layers. One surface of each of the current collector layers is in contact with the positive electrode layer or the negative electrode layer. The other surface of the current collector layer is in contact with the current collector layer of the neighboring solid-state battery cell. The coefficient of friction on the other surface of the current collector layer is higher than the coefficient of friction on the one surface of the current collector layer. This can provide a solid-state battery that does not suffer displacement or rotation when stacking.

3 Claims, 4 Drawing Sheets

(51) Int. Cl.
*H01M 10/0562* (2010.01)
*H01M 4/02* (2006.01)

(52) U.S. Cl.
CPC .. *H01M 10/0562* (2013.01); *H01M 2004/027* (2013.01); *H01M 2004/028* (2013.01)

(56) References Cited

U.S. PATENT DOCUMENTS

2018/0287209 A1  10/2018  Hasegawa et al.
2019/0051935 A1  2/2019   Okamoto et al.

FOREIGN PATENT DOCUMENTS

| | | |
|---|---|---|
| JP | 2016207493 A | 12/2016 |
| JP | 2017168217 A | 9/2017 |
| JP | 2018181451 A | 11/2018 |
| WO | 2017150354 A1 | 9/2017 |

* cited by examiner

SOLID-STATE BATTERY

TECHNICAL FIELD

The present invention relates to a solid-state battery.

BACKGROUND ART

Recently, the demand for batteries with high capacity and high output has rapidly expanded due to the spread of various electric and electronic devices of various sizes such as automobiles, personal computers, and mobile phones. There is a high demand for batteries that exhibit high energy density and output among various types of batteries, and development of further high-performance batteries is expected. Among them, solid-state batteries are attracting attention because the batteries are excellent in that safety is improved because the electrolyte is non-flammable and that they have higher energy density.

Patent Document 1: Japanese Unexamined Patent Application, Publication No. 2014-026747

DISCLOSURE OF THE INVENTION

Problems to be Solved by the Invention

In general, to reduce the interfacial resistance between a positive electrode layer or a negative electrode layer and an electrolyte layer, solid-state battery cells in which the positive electrode layer, the electrolyte layer, and the negative electrode layer are integrated are stacked, and the stacked body is used as one battery. However, when solid-state battery cells are stacked in a solid-state battery, current collectors of metal foil contact with each other, and the friction between the surfaces is small in the contact portion and thus it is slippery. Therefore, during handling, or when an impact is applied from the outside, the displacement or rotation of the stacking position of the solid-state battery cells is likely to occur.

In an electrolyte battery, since a separator that is larger than the electrodes is interposed between the electrodes, a short circuit is less likely to occur, and performance deterioration due to displacement is less likely to occur. Therefore, the displacement and rotation of the stacking position of the battery cells have not been regarded as a major problem. If the cells of the solid-state battery are displaced or rotated from their original stacking position, a short circuit is likely to occur, and a change in resistance occurs due to the bias of a restraining load; thus, it is undesirable with respect to the performance of the battery. In addition, inconvenience arises during handling, leading to a decrease in productivity.

An object of the present invention is to ensure the quality of a solid-state battery and improve the productivity by preventing the above-mentioned displacement or rotation of the stacking position of solid-state battery cells.

Means for Solving the Problems

Provided is a solid-state battery including a plurality of solid-state battery cells stacked on one another, and each of the cells includes a positive electrode layer, a negative electrode layer, a solid-state electrolyte layer, and a pair of current collector layers between which the positive electrode layer, the negative electrode layer, and the solid-state electrolyte layer are disposed. The current collector layer has a first surface in contact with the positive or negative electrode layer. The current collector layer has a second surface in contact with the current collector layer of the cell adjacent to the second surface. The second surface has a coefficient of friction higher than that of the first surface.

This causes a frictional force against lateral displacement on the contact surfaces of the current collectors to occur in the stacked body of the solid-state battery, which prevents displacement or rotation of the stacking position.

The second surface of the current collector layer may have a surface roughness higher than that of the first surface of the current collector layer.

The current collector layer may be composed of a metal foil disposed on the first surface side and a conductive layer disposed on the second surface side.

The conductive layer may be a carbon coated layer.

The current collector layer may be composed of a metal foil disposed on the first surface side and an adhesive layer disposed on the second surface side and having adhesiveness.

Effects of the Invention

According to the present invention, it is possible to prevent the displacement and rotation of the stacking position of the solid-state battery, to ensure the quality of the solid-state battery, and to improve the productivity.

PREFERRED MODE FOR CARRYING OUT THE INVENTION

The following describes a solid-state battery of the present invention and a method of manufacturing the same in detail with reference to the drawings, but the present invention is not limited thereto.

Solid-State Battery Cell

Figure 1:
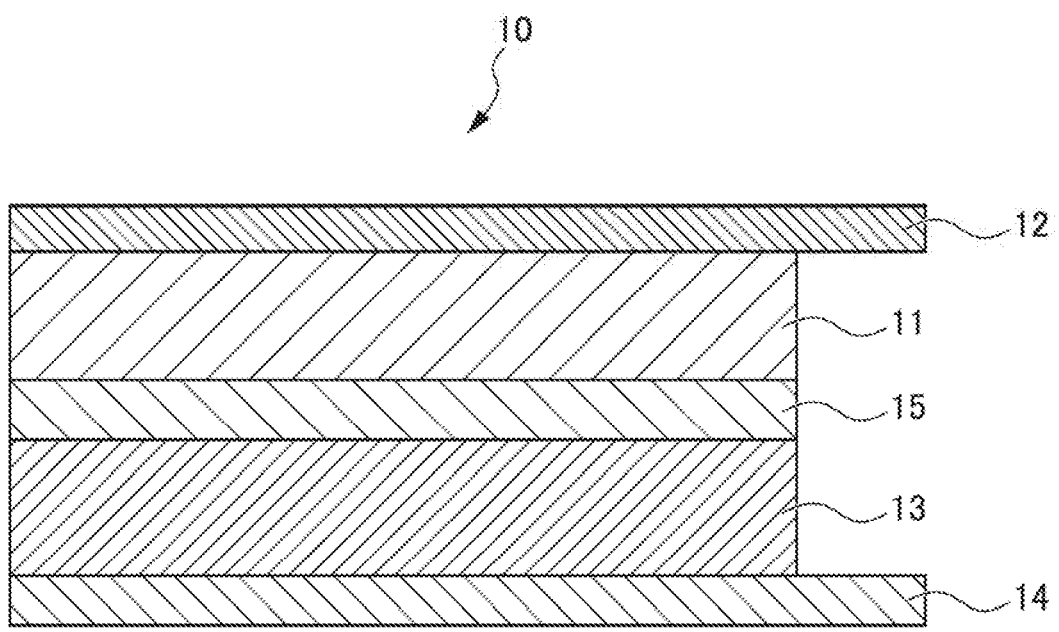
FIG. 1 is a diagram showing an outline of a solid-state battery cell 10 of the present invention.
Figure 2:
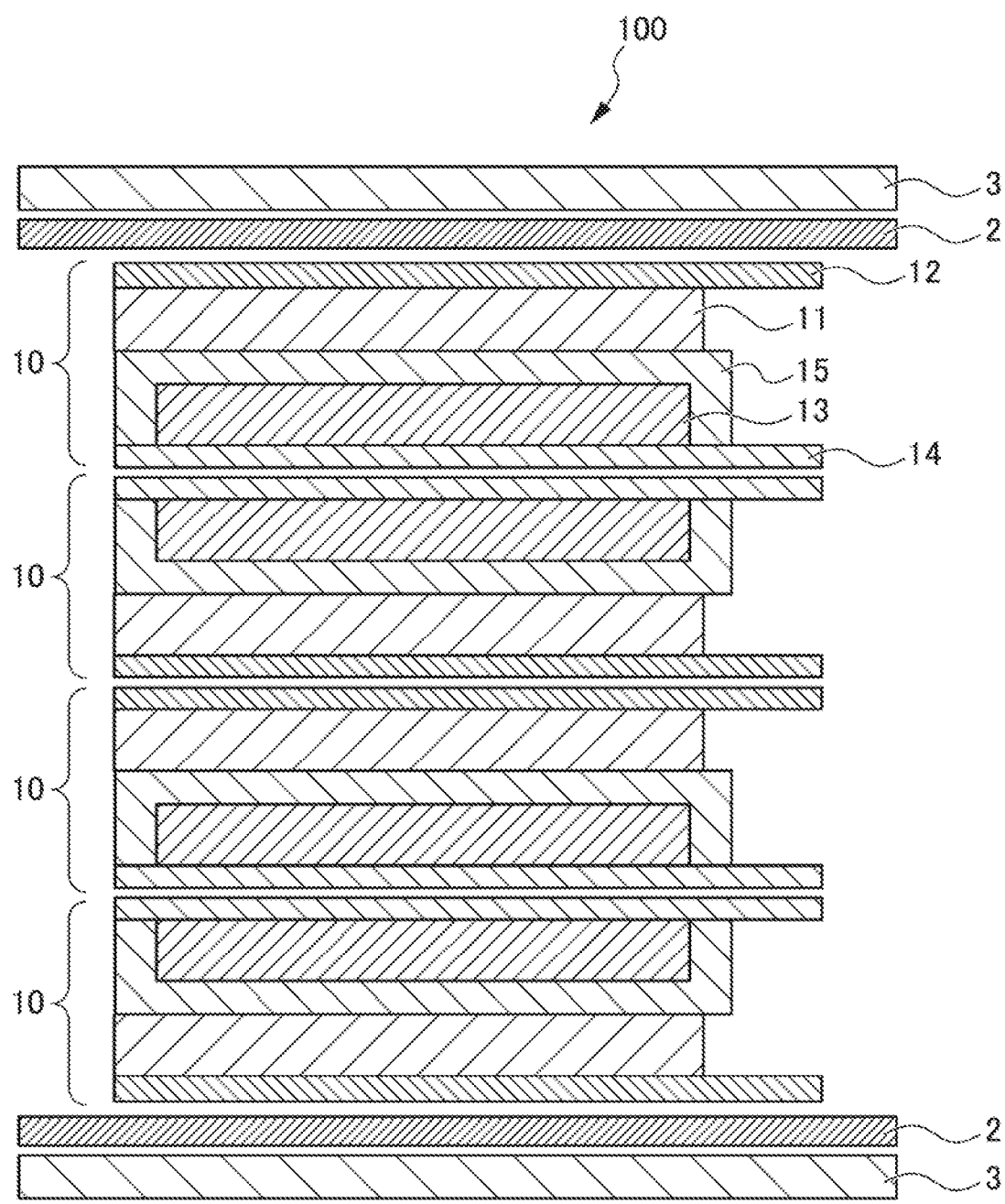
FIG. 2 is a diagram showing a solid-state battery 100 including a plurality of solid-state battery cells of the present invention stacked on one another.

FIG. 1 is a diagram showing an outline of a solid-state battery cell 10 of the present invention. FIG. 2 is a diagram showing a solid-state battery 100 including a plurality of solid-state battery cells of the present invention stacked on one another. The solid-state battery cell 10 of the present invention is configured in a layered form, and includes a positive electrode layer 13, a negative electrode layer 11, and a solid-state electrolyte layer 15 interposed between these electrode layers, and further includes a positive electrode current collector 14 for collecting current from the positive electrode, and a negative electrode current collector 12 for collecting current from the negative electrode. These layers are configured, for example, in order from the top in FIG. 1 as a negative electrode current collector 12, a negative electrode layer 11, a solid-state electrolyte layer 15, a positive electrode layer 13, and a positive electrode current collector 14. Furthermore, by using this configuration as a solid-state battery cell 10 and stacking a plurality of the cells, a high-capacity solid-state battery 100 is formed.

Single-Sided Electrode

The solid-state battery cell 10 of the present invention is of single-sided electrode type in which an electrode mixture is provided only on one side of a current collector. Although a single-sided electrode is inferior in energy density to a double-sided electrode in which an electrode mixture is provided on both sides of a current collector, the positive electrode layer, the negative electrode layer, and the electrolyte layer can be integrally molded for the single-sided electrode, and good interface formation between the positive electrode layer or the negative electrode layer and the electrolyte layer can be maintained; thus, the single-sided electrode is excellent in durability and input/output characteristics.

Positive Electrode Layer

The positive electrode layer 13 used in the solid-state battery of the present invention contains at least a positive electrode active material. As the positive electrode active material, a material capable of releasing and occluding a charge transfer medium may be selected and used as appropriate. From the viewpoint of improving the charge transfer medium conductivity, a solid-state electrolyte may be optionally included. To improve the conductivity, a conductive auxiliary agent may be optionally included. Furthermore, from the viewpoint of exhibiting flexibility or the like, a binder may be optionally included. As for the solid-state electrolyte, the conductive auxiliary agent, and the binder, those commonly used in solid-state batteries can be used.

The positive electrode active material may be the same as that used in the positive electrode active material layers of common solid-state batteries, and is not particularly limited. For example, in lithium-ion batteries, a layered active material containing lithium, a spinel type active material, an olivine type active material, and the like can be used. Specific examples of the positive electrode active material include lithium cobaltate ($LiCoO_2$), lithium nickelate ($LiNiO_2$), $LiNi_pMn_qCo_rO_2$ (p+q+r=1), $LiNi_pAl_qCo_rO_2$ (p+q+r=1), lithium manganate ($LiMn_2O_4$), dissimilar element substituted Li—Mn spinel represented by $Li_{1+x}Mn_{2-x-y}M_yO_4$ (x+y=2, M=at least one selected, from Al, Mg, Co, Fe, Ni, and Zn), and lithium metal phosphate ($LiMPO_4$, M=at least one selected from Fe, Mn, Co, and Ni).

The positive electrode current collector 14 is not particularly limited as long as it has a function of collecting current from the positive electrode layer, for example, aluminum, aluminum alloy, stainless steel, nickel, iron, and titanium can be used, and aluminum, aluminum alloy, and stainless steel are preferred. Examples of the form of the positive electrode current collector 14 include a foil form and a plate form.

Method of Manufacturing Positive Electrode

A positive electrode can be manufactured by disposing a positive electrode mixture containing a positive electrode active material on the surface of the positive electrode current collector. As a method of manufacturing the positive electrode, a known method can be used, and the positive electrode can be manufactured by any of a wet method or a dry method. The following describes a case of manufacturing the positive electrode by the wet method.

The positive electrode is manufactured by the steps of obtaining a positive electrode mixture paste including a positive electrode mixture and a solvent, and coating the positive electrode mixture paste on the surface of the positive electrode current collector and drying the paste to form a positive electrode mixture layer on the surface of the positive electrode current collector. For example, the positive electrode mixture paste is obtained by mixing a positive electrode mixture in a solvent and dispersing the mixture. The solvent used in this case is not particularly limited, and may be selected as appropriate depending on the properties of the positive electrode active material, the solid-state electrolyte, and the like. For example, non-polar solvents such as heptane are preferred. Various mixing and dispersing apparatuses such as an ultrasonic dispersion apparatus, a shaking apparatus, and a FILMIX (registered trademark) can be used for mixing the positive electrode mixture and the solvent and dispersing the mixture. The solid content in the positive electrode mixture paste is not particularly limited.

The positive electrode mixture paste thus obtained is coated on the surface of the positive electrode current collector and dried to form a positive electrode mixture layer on the surface of the positive electrode current collector, whereby a positive electrode can be obtained. As a means for coating the positive electrode paste on the surface of the positive electrode current collector, a known coating means such as a doctor blade may be used. The total thickness of the positive electrode mixture layer and the positive electrode current collector after drying (thickness of the positive electrode) is not particularly limited, but for example, from the viewpoint of energy density and lamination property, it is preferably 0.1 μm or more and 1 mm or less, and more preferably 1 μm or more and 100 μm or less. In addition, the positive electrode may be manufactured optionally through a pressing process. The pressure when pressing the positive electrode can be about 100 MPa.

Negative Electrode Layer

The negative electrode layer 11 used in the solid-state battery of the present invention contains at least a negative electrode active material. From the viewpoint of improving the charge transfer medium conductivity, a solid-state electrolyte may be optionally included. In addition, to improve the conductivity, a conductive auxiliary agent may be optionally included. Furthermore, from the viewpoint of exhibiting flexibility or the like, a binder may be optionally included. As for the solid-state electrolyte, the conductive auxiliary agent, and the binder, those commonly used in solid-state batteries can be used.

The negative electrode active material is not particularly limited as long as it can occlude and release a charge transfer medium, for example, in lithium-ion batteries, lithium transition metal oxides such as lithium titanate ($Li_4Ti_5O_{12}$), transition metal oxides such as $TiO_2$, $Nb_2O_3$, and $WO_3$, metal sulfides, metal nitrides, carbon materials such as graphite, soft carbon, and hard carbon, metallic lithium, metallic indium, lithium alloys, and the like can be used. Furthermore, the negative electrode active material may be in a powder form or in a thin film form.

The negative electrode current collector 12 is not particularly limited as long as it has a function of collecting current from the negative electrode layer 13. Example materials for the negative electrode current collector 12 include nickel, copper, and stainless steel. Example forms of the negative electrode current collector 12 include a foil form and a plate form.

Method of Manufacturing Negative Electrode

As in the positive electrode, the negative electrode can be manufactured, for example, in the following manner: a negative electrode active material or the like is added to a solvent, this mixture is dispersed with an ultrasonic dispersion apparatus or the like and thereby forms a negative electrode mixture paste, this paste is coated on the surface of the negative electrode current collector, and subsequently the paste is dried. The solvent used in this case is not particularly limited and may be selected as appropriate depending on the properties of the negative electrode active material and the like. The thickness of the negative electrode is, for example, preferably 0.1 µm or more and 1 mm or less, and more preferably 1 µm or more and 100 µm or less. In addition, the negative electrode can be manufactured through a pressing process. The pressure at the time of pressing the negative electrode is preferably 200 MPa or more, more preferably about 400 MPa.

Solid-State Electrolyte Layer

The solid-state electrolyte layer 15 is a layer laminated between the positive electrode layer 13 and the negative electrode layer 11, and contains at least a solid-state electrolyte material. Charge transfer medium conduction between the positive electrode active material and the negative electrode active material can be performed via the solid-state electrolyte material contained in the solid-state electrolyte layer 15.

The solid-state electrolyte material is not particularly limited as long as it has charge transfer medium conductivity, and examples thereof include sulfide solid-state electrolyte materials, oxide solid-state electrolyte materials, nitride solid-state electrolyte materials, and halide solid-state electrolyte materials, and among them, sulfide solid-state electrolyte materials are preferred. This is because sulfide solid-state electrolyte materials have charge transfer medium conductivity higher than that of oxide solid-atate electrolyte materials.

Examples of sulfide solid-state electrolyte materials include $Li_2S$—$P_2S_5$ and $Li_2S$—$P_2S_5$—$LiI$ in lithium-ion batteries. Note that the above-described "$Li_2S$—$P_2S_5$" means sulfide solid-state electrolyte materials formed using a raw material composition including $Li_2S$ and $P_2S_5$, and the same applies to $Li_2S$—$P_2S_5$—$LiI$.

Examples of oxide solid-state electrolyte materials include NASICON-type oxides, garnet-type oxides, and perovskite-type oxides in lithium-ion batteries. Examples of NASICON-type oxides include oxides containing Li, Al, Ti, P, and O (e.g., $Li_{1.5}Al_{0.5}Ti_{1.5}(PO_4)_3$). Examples of garnet-type oxides include oxides containing Li, La, Zr, and O (e.g., $Li_7La_3Zr_2O_{12}$). Examples of perovskite-type oxides include oxides containing Li, La, Ti, and O (e.g., $LiLaTiO_3$).

Method of Manufacturing Solid-State Electrolyte Layer

The solid-state electrolyte layer 15 can be manufactured, for example, through a pressing process of a solid-state electrolyte, etc. Alternatively, the solid-state electrolyte layer can be manufactured through a process of coating a solid-state electrolyte paste, which is prepared by dispersing a solid-state electrolyte, etc. in a solvent, on the surface of a base material or an electrode. The solvent used in this case is not particularly limited and may be selected as appropriate depending on the properties of the binder and the solid-state electrolyte. The thickness of the solid-state electrolyte layer greatly varies depending on the configuration of the battery, but for example, is preferably 0.1 µm or more and 1 mm or less, and more preferably 1 µm or more and 100 µm or less.

Coefficient of Friction

For stacked solid-state battery cells, when the coefficient of friction of the contact surfaces between the battery cells is increased, the frictional resistance force against lateral displacement is increased, and thus, displacement and rotation of the stacking position are less likely to occur. Note that the coefficient of friction is originally a relative measure between two objects in contact, and is not uniquely determinable for only one object. However, since the purpose of the present invention is to compare the magnitude of the coefficients of friction of different groups of objects with respect to the same object (adjacent solid-state battery cell), the coefficient of friction with respect to the same object (adjacent solid-state battery cell) will be described as being unique to one object.

By the processing of increasing the coefficient of friction of a surface in contact with another solid-state battery cell, of both electrode current collector layers, displacement or rotation of the stacking position during stacking of the solid-state battery ceils can be prevented. This processing can be performed, for example, by sandblasting, plating, coating of conductive paste, coating of adhesive, etc. with respect to the current collector. For plating, plating with a highly conductive substance such as carbon is preferred.

Surface Roughness

By increasing the surface roughness and the coefficient of friction of the second surface of the current collectors, displacement or rotation of the stacking position during stacking of the solid-state battery cells can be prevented. This is performed, for example, by sandblasting the current collector. The material, particle size, and the like of the sand used in the sandblasting are not particularly limited, and any material may be used as long as it can prevent the displacement or rotation of the stacked body of solid-state battery cells 10a. Furthermore, it is preferable to sufficiently remove insulating sand by ultrasonic cleaning after grinding not to impair the conductivity of both electrode current collectors due to the residual sand. Furthermore, as long as it is sufficient to prevent the displacement and rotation of the stacked body of the solid-state battery cells, the adjustment method of the surface roughness is not limited to the sandblasting method.

Formation of Conductive Layer

Also, by forming a conductive layer with a higher coefficient of friction of the surface on the second surface of the current collector, displacement or rotation of the stacking position during stacking of the solid-state battery cells can be prevented. This is performed, for example, by a carbon coating process. The formation pattern and the thickness of a carbon coated conductive layer are not particularly limited, and are sufficient as long as the displacement and rotation of the stacked body of the solid-state battery cells can be prevented. From the viewpoint of energy density, it is preferable that the lamination thickness is not too large. Furthermore, the adjustment of the coefficient of friction is not limited to the coating with carbon as long as the displacement and rotation of the stacked body of the solid-state battery cells can be prevented and sufficient conductivity is provided, for example, coating may be performed with a conductive paste.

Adhesive Layer

Also, displacement or rotation of the stacking position during stacking of the solid-state battery cells can be prevented by forming an adhesive layer having adhesiveness on the second surface of the current collector. The method of forming the adhesive layer or the material for the adhesive layer may be those enabling electrical conduction between both current collectors, and the adhesive layer may be bonded using an adhesive or a double-sided tape, but the adhesive layer is preferably conductive. Note that from the viewpoint of conductivity, the adhesive layer does not necessarily need to be formed over the entire surface of the current collector, but it only needs to prevent displacement or rotation of the stacking position.

Method of Manufacturing Solid-State Battery

The solid-state battery cell 10 of the present invention is manufactured by laminating the positive electrode layer, the solid-state electrolyte layer, the negative electrode layer, and the current collector layers in the order shown in FIG. 1. Note that after these layers are laminated, they may be optionally pressed and integrated. Furthermore, by using this configuration as a solid-state battery cell and stacking a plurality of the cells to be integrated, a high output solid-state battery 100 can be formed. The solid-state battery 100 may be optionally pressed and integrated again. Thus, the current collectors with increased coefficient of friction are crimped to each other, and the unevenness of the surface of each current collector is meshed with each other, whereby displacement and rotation of the stacking position are further unlikely to occur.

Embodiments

Embodiments of the present invention will be described in detail using examples.

Figure 3:
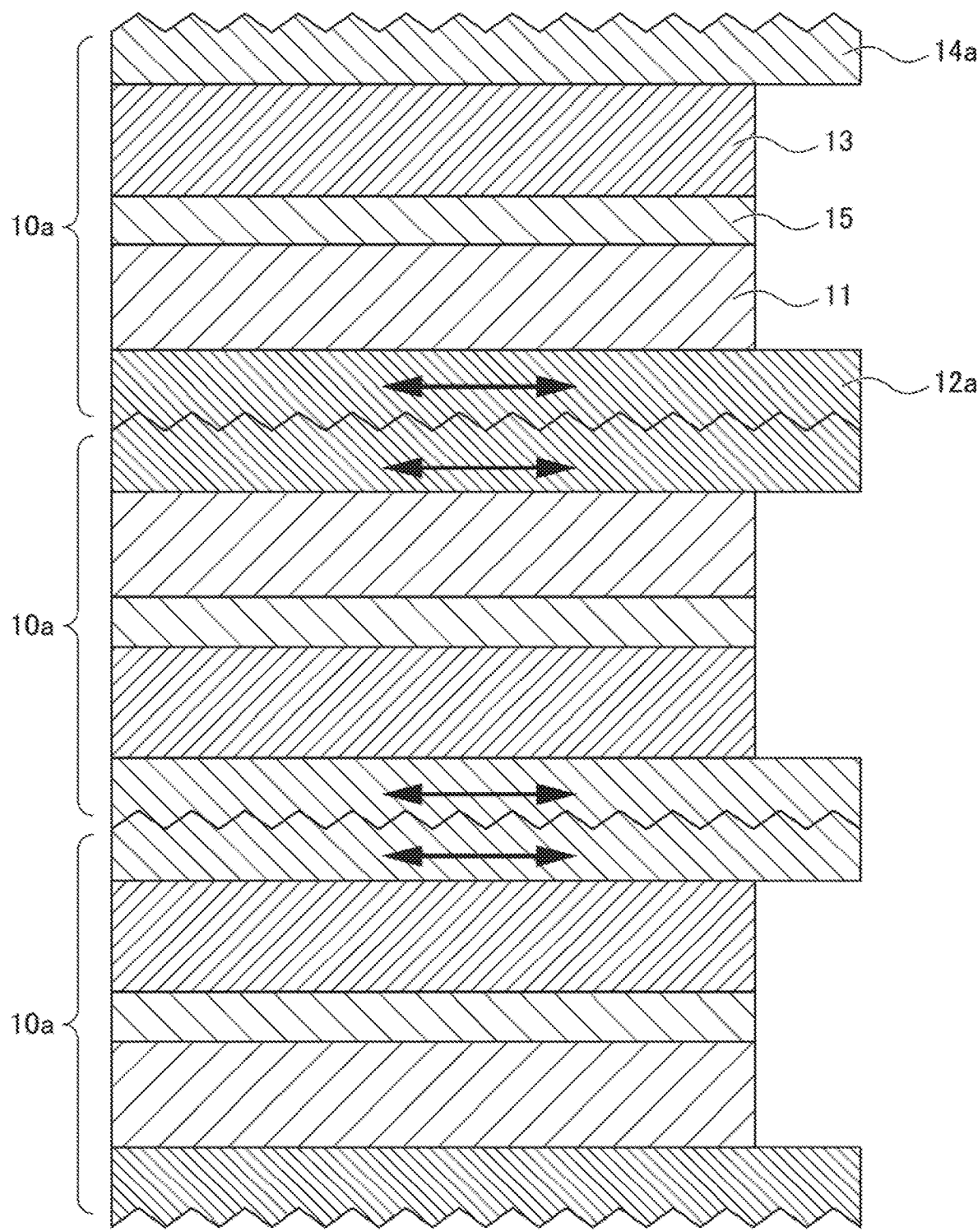
FIG. 3 is a diagram showing an outline of a stacked body of solid-state battery cells 10a of the present invention.

FIG. 3 is a diagram showing an outline of a stacked body of solid-state battery cells 10a with an increased surface roughness and coefficient of friction of the second surface of the current collector layer. The second surfaces of the positive electrode current collector 14a and the negative electrode current collector 12a of the solid-state battery cell 10a are ground by sandblasting, and have a high surface roughness.

For a plurality of the solid-state battery cells 10a stacked on one another, since the positive electrode current collectors 14a mesh with each other and the negative electrode current collectors 12a mesh with each other due to the unevenness of the contact surfaces, when a force is applied in a direction perpendicular to the stacking direction, a frictional force against lateral displacement occurs. As a result, the displacement and rotation of the stacking position of the solid-state battery cells can be prevented.

Figure 4:
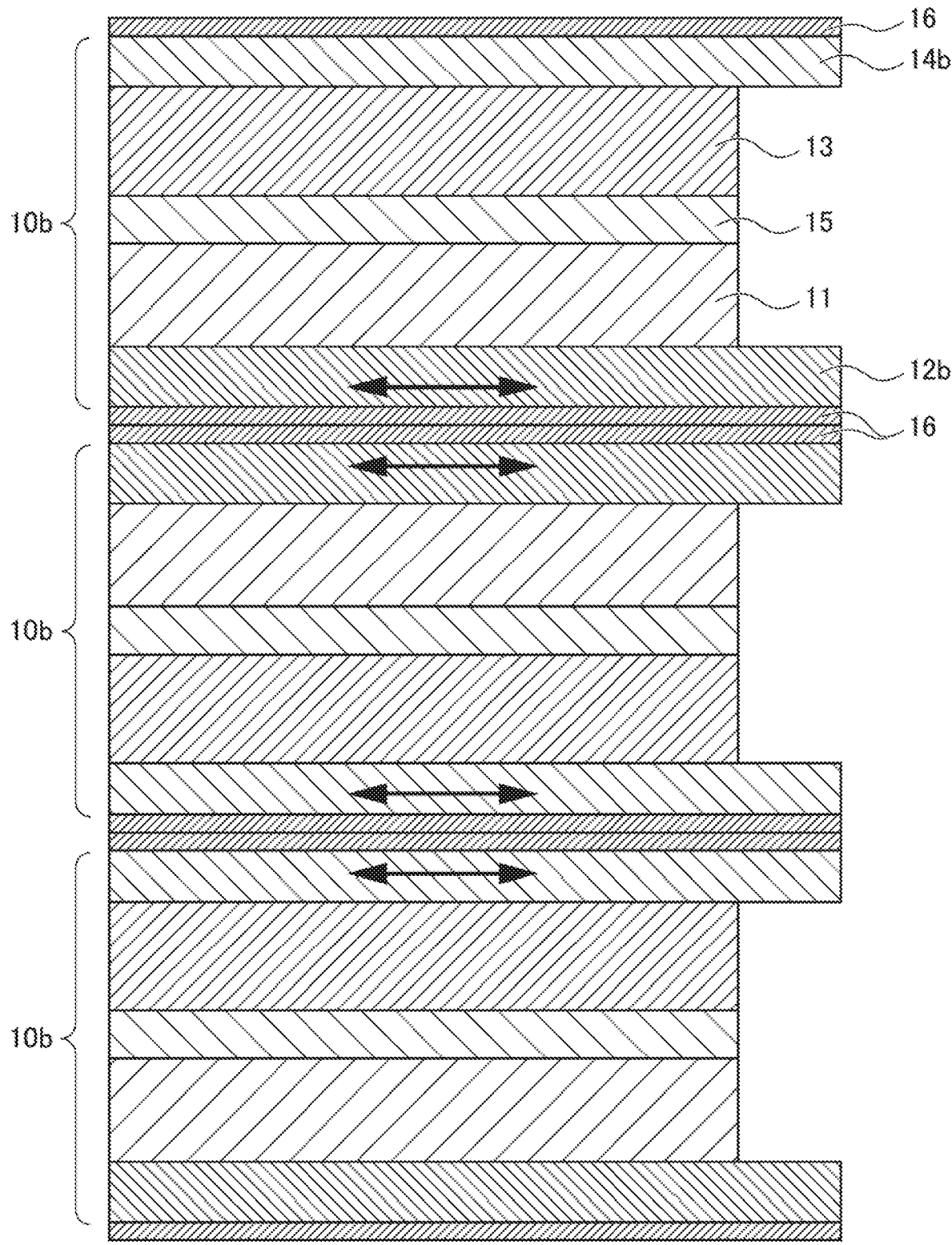
FIG. 4 is a diagram showing an outline of a stacked body of solid-state battery cells 10b of the present invention.

FIG. 4 is a diagram showing an outline of a stacked body of solid-state battery cells 10b in which a carbon coated layer 16 having conductivity is disposed on the second surface side of the current collector layer, and the coefficient of friction is increased. For the positive electrode current collector 14b and the negative electrode current collector 12b of the solid-state battery cell 10b, the carbon coated layer 16 is formed on the second surface by a carbon coating process. At this time, the carbon coated layer 16 has an uneven surface, and thus has a constant coefficient of friction.

For a plurality of the solid-state battery cells 10b stacked on one another, since the positive electrode current collectors 14b mesh with each other and the negative electrode current collectors 12b mesh with each other due to the fine unevenness of the carbon coated layers 16 on the contact surfaces, when a force is applied in a direction perpendicular to the stacking direction, a frictional force against lateral displacement occurs. As a result, the displacement and rotation of the stacking position of the solid-state battery cells can be prevented. Furthermore, since the carbon coated layer 16 has conductivity, it does not prevent the transfer of charges between the current collectors during stacking.

EXPLANATION OF REFERENCE NUMERALS 10 solid-state battery cell
10a solid-state battery cell (sandblasting)
10b solid-state battery cell (formation of surface layer)
11 negative electrode layer
12 negative electrode current collector
12a negative electrode current collector (sandblasting)
12b negative electrode current collector (formation of surface layer)
13 positive electrode layer
14 positive electrode current collector
14a positive electrode current collector (sandblasting)
14b positive electrode current collector (formation of surface layer)
15 solid-state electrolyte layer
16 carbon coated layer
100 stacked battery
2 insulating material
3 battery case

The invention claimed is:

1. A solid-state battery comprising:
a plurality of solid-state battery cells stacked on one another, each of the cells comprising a positive electrode layer, a negative electrode layer, a solid-state electrolyte layer, and a pair of current collector layers between which the positive electrode layer, the negative electrode layer, and the solid-state electrolyte layer are disposed,
one of the pair of current collector layers having a first surface in contact with the positive or negative electrode layer,
one of the pair of current collector layers having a second surface in contact with one of the pair of current collector layers of the cell adjacent to the second surface, the second surface having a coefficient of friction higher than that of the first surface, and
one of the pair of current collector layers being composed of a metal foil disposed on the first surface side and a conductive layer disposed on the second surface side, the conductive layer having a surface with fine unevenness that causes a frictional force.

2. The solid-state battery according to claim 1, wherein the conductive layer is a carbon coated layer.

3. A solid-state battery comprising:
a plurality of solid-state battery cells stacked on one another, each of the cells comprising a positive electrode layer, a negative electrode layer, a solid-state electrolyte layer, and a pair of current collector layers between which the positive electrode layer, the negative electrode layer, and the solid-state electrolyte layer are disposed, one of the pair of current collector layers having a first surface in contact with the positive or negative electrode layer, one of the pair of current collector layers having a second surface in contact with one of the pair of current collector layers of the cell adjacent to the second surface, the second surface having a coefficient of friction higher than that of the first surface; and one of the pair of current collector layers being composed of a metal foil disposed on the first surface side and an adhesive layer disposed on the second surface side and having adhesiveness, the adhesive layer being formed only on a partial surface of the metal foil, the adhesive layer being conductive.

* * * * *